UNITED STATES PATENT OFFICE.

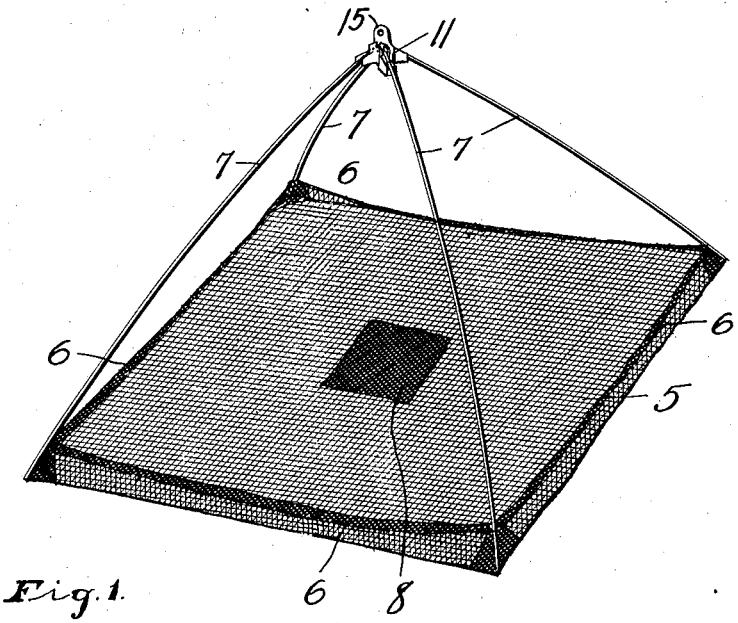
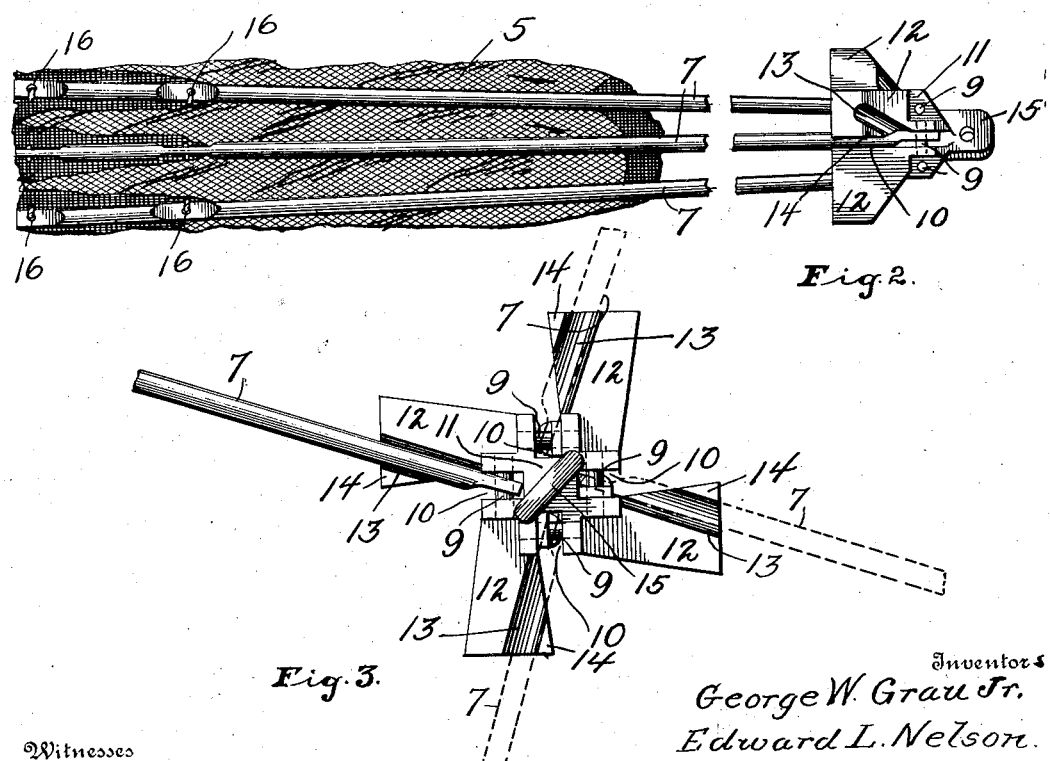

GEORGE W. GRAU, JR., AND EDWARD L. NELSON, OF COLUMBUS, OHIO.

MINNOW-NET.

No. 872,652.	Specification of Letters Patent.	Patented Dec. 3, 1907.

Application filed April 10, 1907. Serial No. 367,314.

*To all whom it may concern:*

Be it known that we, GEORGE W. GRAU, Jr., and EDWARD L. NELSON, citizens of the United States, residing at Columbus, in the county of Franklin and State of Ohio, have invented certain new and useful Improvements in Minnow-Nets, of which the following is a specification.

Our invention relates to minnow nets and has for its object the provision of a device of this character constructed in such manner that it may be folded up for convenience in transportation or spread open to an operative position with very little trouble.

A further object of the invention is the provision of a net of this character comprising a bottom portion and side wall portions, the side wall portions being adapted to stop the outward rush of the minnows when the net is being drawn toward the surface of the water.

Further objects and advantages of the invention will be set forth in the detailed description which now follows:

In the accompanying drawing: Figure 1 is a perspective view of a minnow net constructed in accordance with the invention, Fig. 2 is a side elevation of the net in its folded position, and, Fig. 3 is a plan view of a central pivot block hereinafter described.

Like numerals designate corresponding parts in all of the figures of the drawing.

Referring to the drawing, the numeral 5 designates the bottom portion of the net, said net being provided with side walls 6, these side walls being secured at their corners to spring bars or rods 7. The net 5 is provided with a central patch 8 which is adapted to receive the bait for attracting the minnows to the central portion of the net. At their upper ends the bars 7 are pivoted upon pins 9, these pins spanning recesses 10 formed in a block 11. This block carries a plurality of integral arms 12 which are provided with diagonal channels 13 in their upper faces, these channels being located at one side of the arms and one wall of these channels being formed by very short narrow shoulders 14. The block 11 carries a perforated extension 15 to which any desired flexible member such as a cord or wire or the like, may be secured for the purpose of raising and lowering the net from the water. The lower ends of the bars 7 are perforated at 16 for the reception of thread adapted to secure these bars to the corners of the net proper.

The operation of the device is as follows: When the net is not in use, the parts lie in the position illustrated in Fig. 2. In other words, the bars 7 lie in the recesses 10 and the net is folded between said bars. When it is desired to use the net, however, these bars are moved to the position illustrated in Figs. 1 and 3. In other words, they are hooked over the shoulders 14 and lie in the channels 13 of the blocks 12, these channels holding them in the distended position illustrated in Fig. 1 and the tension imparted to them by reason of the fact that their movement is limited by the net, causes them to engage firmly in the channels and remain fixed therein. The net is then lowered into the water, the necessary bait being first placed upon the patch 8. The minnows are then attracted by this bait and the net is drawn quickly to the surface of the water. The minnows try to escape as the net is lifted, but the side walls 5 of the net prevent their escape, the patch 8 in the center of the net offering sufficient resistance to the water to pull the bottom of the net down until the net presents an almost bag-like form.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What we claim, is—

1. In a device of the character described, the combination with a central block comprising a plurality of arms having channels formed in the upper faces thereof, of a plurality of resilient rods pivoted in said blocks, and a net to the corners of which the free ends of the rods are secured, said rods being adapted to lie in the channels of the arms when the device is in use.

2. In a device of the character described, the combination with a central block, of a plurality of arms carried by said block, said arms having channels in the upper faces thereof and a plurality of resilient rods pivoted for swinging and a slight lateral movement in said block and adapted to be moved into or out of engagement with the channels of the arms, and a net to which the free ends of said rods are secured.

In testimony whereof we affix our signatures in presence of two witnesses.

GEORGE W. GRAU, Jr.
EDWARD L. NELSON.

Witnesses:
A. L. Phelps,
L. Carl Stoughton.